(12) United States Patent
Deng et al.

(10) Patent No.: US 7,450,137 B2
(45) Date of Patent: Nov. 11, 2008

(54) SYSTEM AND METHOD FOR BLENDING IMAGES

(75) Inventors: Yining Deng, San Mateo, CA (US); D. Amnon Silverstein, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 643 days.

(21) Appl. No.: 11/060,918

(22) Filed: Feb. 18, 2005

(65) Prior Publication Data

US 2006/0187234 A1 Aug. 24, 2006

(51) Int. Cl.
*G09G 5/00* (2006.01)

(52) U.S. Cl. .................... 345/629; 345/589; 345/592; 345/619; 382/272; 382/284

(58) Field of Classification Search ................. None
See application file for complete search history.

(56) References Cited

U.S. PATENT DOCUMENTS

| | | | |
|---|---|---|---|
| 5,138,460 A | 8/1992 | Egawa | |
| 5,444,478 A | 8/1995 | Lelong et al. | |
| 5,594,841 A * | 1/1997 | Schutz | ............... 345/419 |
| 5,982,951 A | 11/1999 | Katayama et al. | |
| 6,181,441 B1 | 1/2001 | Walsh | |
| 6,348,981 B1 | 2/2002 | Walsh | |
| 6,507,665 B1 * | 1/2003 | Cahill et al. | ............... 382/154 |
| 6,714,249 B2 | 3/2004 | May et al. | |
| 6,720,997 B1 * | 4/2004 | Horie et al. | ............... 348/218.1 |
| 6,813,391 B1 | 11/2004 | Uyttendaele et al. | |
| 2004/0169663 A1 * | 9/2004 | Bernier | ............... 345/629 |
| 2006/0072852 A1 * | 4/2006 | Kang et al. | ............... 382/294 |
| 2006/0115182 A1 * | 6/2006 | Deng et al. | ............... 382/284 |
| 2006/0125921 A1 * | 6/2006 | Foote | ............... 348/159 |

* cited by examiner

*Primary Examiner*—Kee M. Tung
*Assistant Examiner*—Jwalant Amin (57) ABSTRACT

A method of blending a pair of images, each image comprising a plurality of pixels having an intensity. A blending edge is determined for each image, each blending edge comprising at least one group of pixels, with each pixel at a pixel position, and an average intensity of pixels of the blending edges is determined at each pixel position. The method includes determining a scaling factor based on a relationship between the average intensity and the intensity of the pixel of the at least one group of pixels of the blending edge at each pixel position of each image. A blending area is determined for each image, each blending area comprising at least one group of pixels having a pixel at each of the pixel positions. The intensity of the pixel at each pixel position of the at least one group of pixels of the blending area of each image is scaled with the corresponding scaling factor.

23 Claims, 7 Drawing Sheets

SYSTEM AND METHOD FOR BLENDING IMAGES

CROSS-REFERENCE TO RELATED APPLICATIONS

This application is related to U.S. patent application Ser. No. 11/000,660, entitled SYSTEM AND METHOD OF ALIGNING IMAGES FROM MULTIPLE CAPTURING DEVICES, which is assigned to the assignee of the present invention, and is hereby incorporated by reference herein.

BACKGROUND

Image stitching is a process of blending together two or more images to form a single image. For example, images from a single camera are sometimes stitched to form a single panoramic image of a scene. Also, multiple cameras are often employed to capture multiple images or videos which are stitched together to form a panoramic image or video of a scene (e.g. Cinerama or "widescreen" movies). When multiple cameras are employed, the cameras are generally mechanically indexed with one another so as to create a continuous scene across transitions between cameras.

Typically, the cameras are also adjusted so as to have the same settings, such as exposure settings, for example. Nevertheless, there a generally differences in intensity between acquired images due to a variety of factors such as, for example, inherent differences in tolerances of cameras and changes in lighting conditions over time. Consequently, when stitched together, the resulting panoramic image will often exhibit distinct edges at the boundaries of the individual images due to the differing intensities. This can be particularly troublesome for panoramic movies/videos, where intensities can vary between images of a same frame and between images of different frames, resulting in a "flickering" effect when the movie is viewed. To reduce such effects, the intensities of adjacent images are generally adjusted during the stitching process so that the images blend together more seamlessly.

Standard image blending techniques typically require an overlap area between two images. However, in order to obtain the largest field of view possible, multiple camera systems are often mechanically indexed to minimize or eliminate overlap between images. In such instances, images may have very little overlap or merely abut one another with no overlap at all.

SUMMARY

In one embodiment, the present invention provides a method of blending a pair of images, each image comprising a plurality of pixels having an intensity. A blending edge is determined for each image, each blending edge comprising at least one group of pixels, with each pixel at a pixel position, and an average intensity of pixels of the blending edges is determined at each pixel position. The method includes determining a scaling factor based on a relationship between the average intensity and the intensity of the pixel of the at least one group of pixels of the blending edge at each pixel position of each image. A blending area is determined for each image, each blending area comprising at least one group of pixels having a pixel at each of the pixel positions. The intensity of the pixel at each pixel position of the at least one group of pixels of the blending area of each image is scaled with the corresponding scaling factor.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1A:
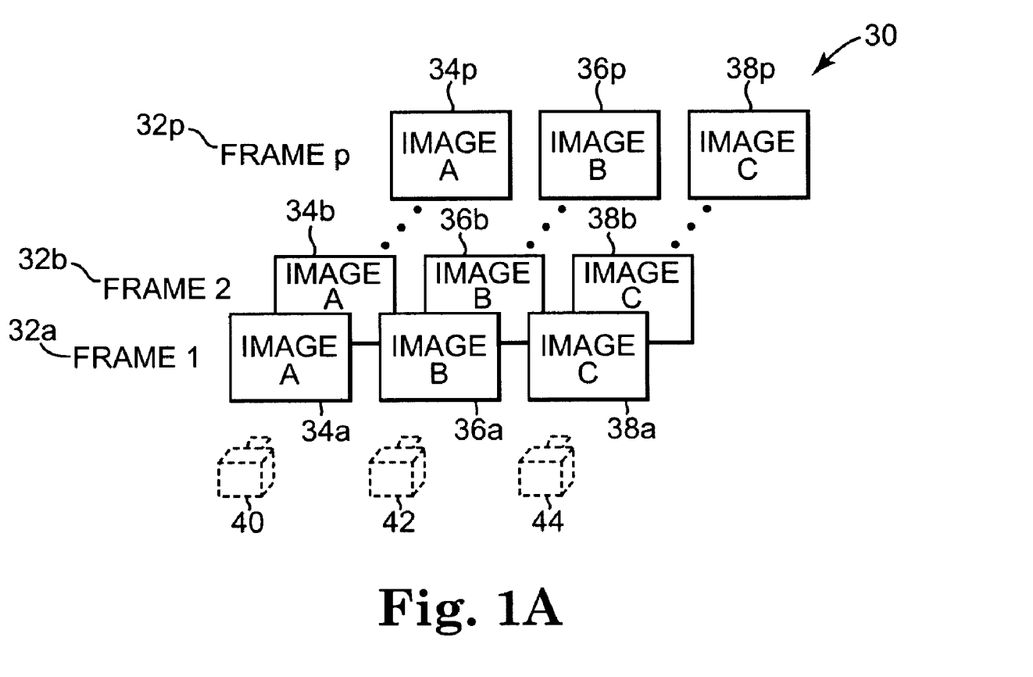
FIG. 1A illustrates generally an example of a shot of a panoramic movie/video.

FIG. 1A illustrates generally an example of a shot 30 of a panoramic movie/video comprising a sequence of frames, illustrated as frames 32a through 32p. Each frame 32 of shot 30 comprises a sequence of three images, with each image being at a different position in the sequence. As illustrated, each frame 32 comprises an image 34 in an image position "A", an image 36 in an image position "B", and an image 38 in an image position "C". When making a panoramic video or movie, three cameras are often employed, such as cameras 40, 42 and 44, with each camera providing one image of the sequence of each frame 32. As illustrated, cameras 40, 42, and 44 respectively provide images 34, 36, and 38 of each frame 32, such as images 34a, 36a, and 38a of frame 32a.

Figure 1B:
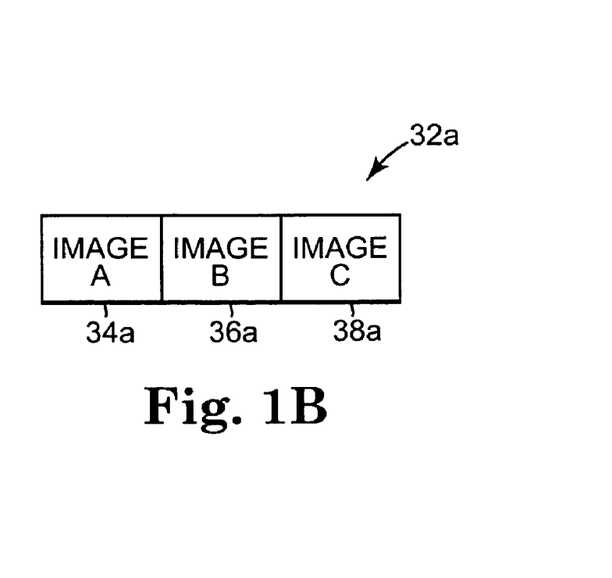
FIG. 1B illustrates generally an example of a frame of a panoramic movie/video comprising abutting images.
Figure 1C:
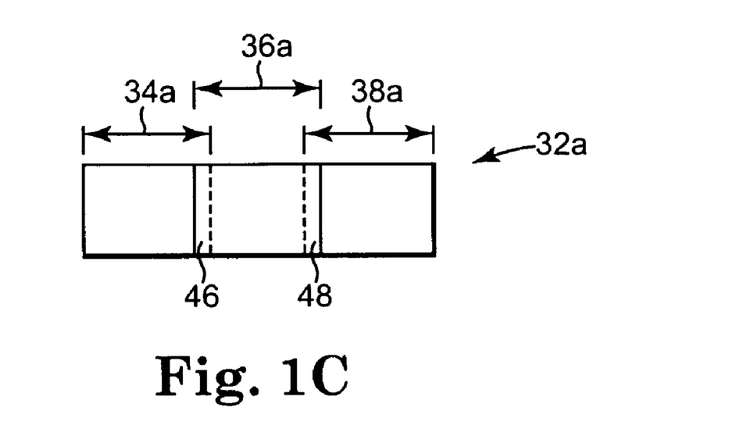
FIG. 1C illustrates generally an example of a frame of a panoramic movie/video comprising overlapping images.
Figure 1D:
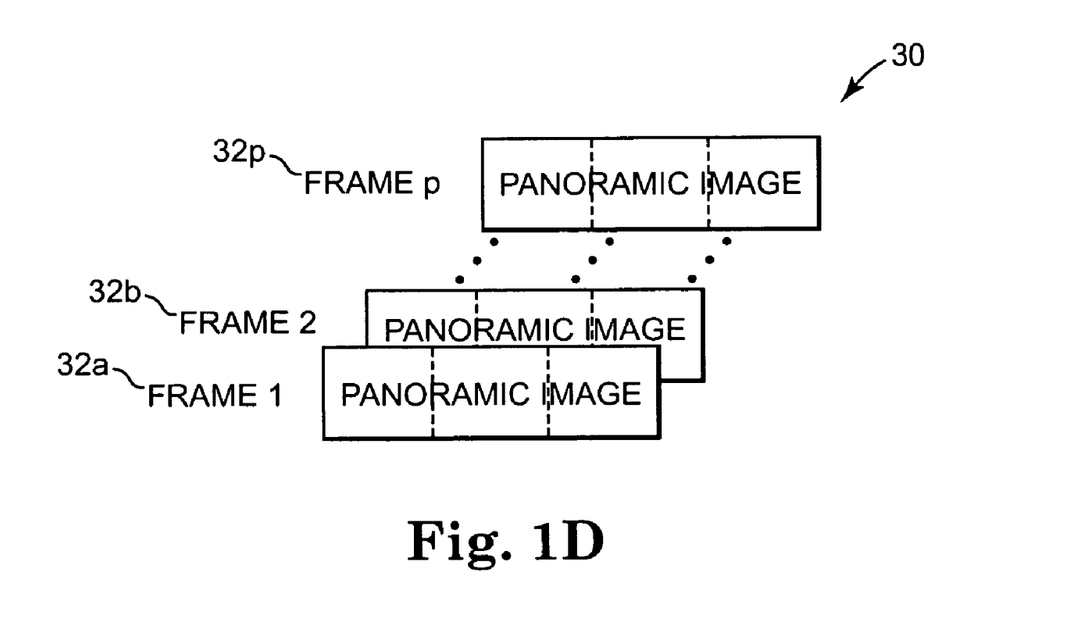
FIG. 1D illustrates generally an example of a panoramic image formed by stitching together the frame of images illustrated by FIG. 1B and/or FIG. 1C.

The cameras are typically located at a center of a scene and mechanically indexed with one another and positioned at different angles so that together, the images provided by the cameras form a panoramic view of the scene. In one embodiment, as illustrated by FIG. 1B, to obtain the largest field of view as possible, cameras 40, 42 and 44 are positioned so that the images of each frame, such as images 34a, 36a, and 38a, do not overlap, but abut one another. In another embodiment, as illustrated by FIG. 1C, cameras 40, 42, and 44 are positioned so that there is a minimal overlap area between adjacent images, as illustrated by overlap areas 46 and 48 respectively between images 34a, 36a and images 36a, 38a. In either instance, as illustrated by FIG. 1D, the images of each frame 32 are subsequently stitched, or blended, to form a single panoramic image of the scene.

Figure 2:
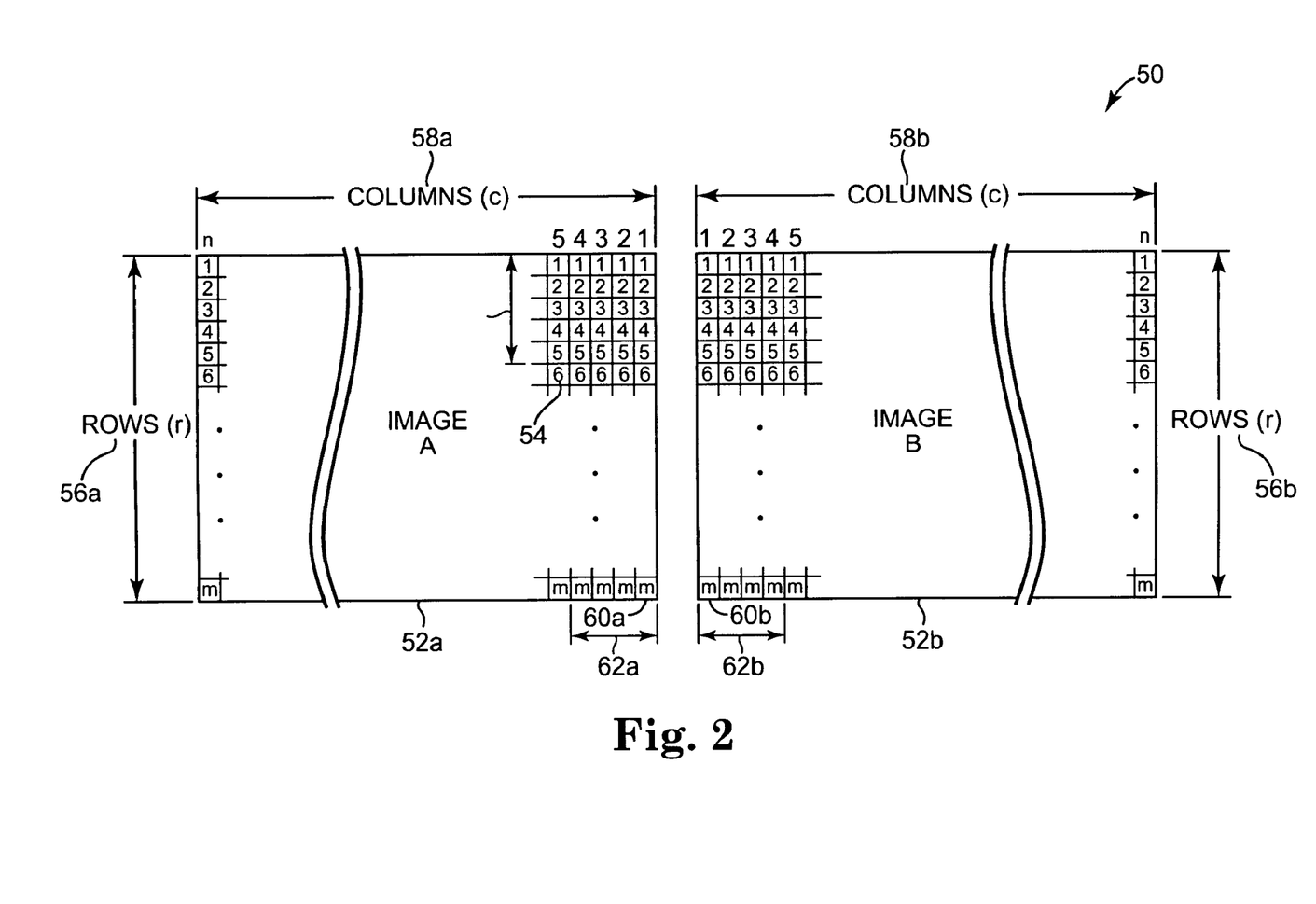
FIG. 2 illustrates generally an example of a pair of abutting images.

FIG. 2 illustrates a pair 50 of images 52a and 52b, similar to those illustrated above by abutting images 34a and 36a of FIG. 1B, which abut one another and, when stitched together, form a single panoramic image. Each image comprises a plurality of pixels, as illustrated by pixel 54, arranged in a plurality of rows 56 and columns 58. As illustrated, abutting images 52a and 52b each respectively comprise "m" rows of pixels 56a, 56b and "n" columns of pixels 58a, 58b. Images 52a and 52b can comprise any number of a plurality rows and columns of pixels 54. In one example embodiment, images 52a and 52b each comprise 1,024 rows (r) 56 and 2,048 columns (c) 58 of pixels.

Each individual pixel 54 of images 54a and 54b has a corresponding intensity (I). Pixels generally comprise three color channels, with each color channel having a corresponding intensity. Although not specifically indicated, the term intensity (I) as used herein can refer to an average intensity of a pixel based on the intensity of each color channel and to the intensity of each individual color channel. As such, the present invention can be applied to blend the average intensities of pixels and to blend the intensities of each individual color channel.

As described earlier, intensity levels nearly always vary between images, such as images 52a and 52b, with such variations resulting from factors such as inherent mechanical tolerances between cameras, camera processing, different exposures, changes in lighting conditions over time, and different development/aging of the individual images. Consequently, even though images may be nearly perfectly aligned when stitched together, such as images 52a and 52b, the resulting panoramic image will often exhibit distinct edges at the stitching boundaries of the individual images due to differing intensity levels between the image.

Figure 3:
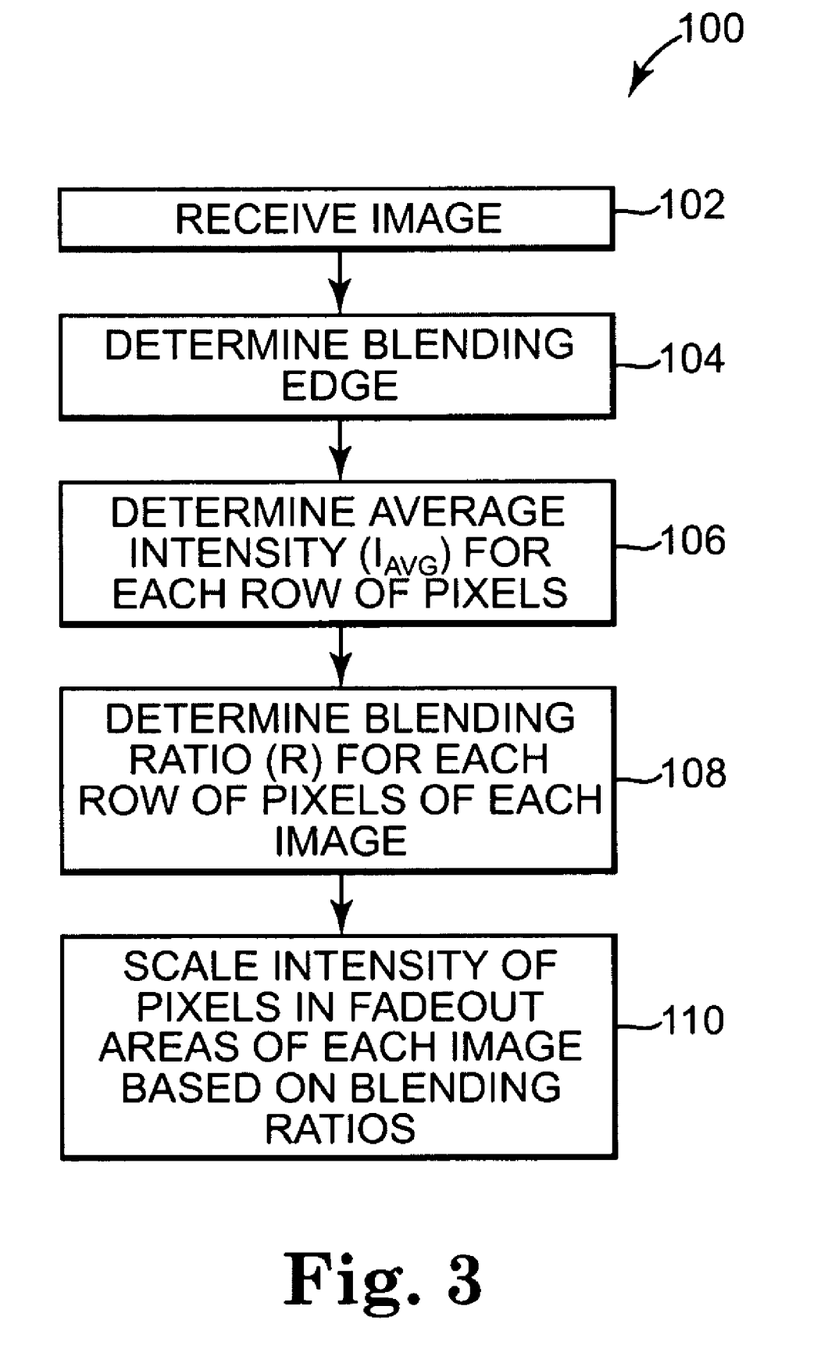
FIG. 3 is a flow diagram illustrating generally a process for blending abutting images according to one exemplary embodiment of the present invention.

FIG. 3 is a flow diagram illustrating generally a process 100 according to one embodiment of the present invention for blending the edges between two abutting images. Process 100 is described with reference to the pair 50 of images 52a and 52b described above by FIG. 2. Process 100 begins at 102 with receipt of a pair of abutting images, such as pair 50 of abutting images 52a and 52b.

At 104, a blending edge is determined for the two images. The blending edge simply comprises the area along the edge of each image at which the pair of images meet. In one embodiment, as illustrated, the blending edge of abutting images, such as abutting images 52a and 52b, comprises the first column of pixels of each image adjacent to the edges along which the images meet. Thus, in the illustrated example, the blending edge 60 comprises column "1" of image 52a and column "1" of image 52b, respectively indicated at 60a and 60b.

At 106, an average intensity ($I_{AVG}$) is determined for each row 56 based on intensities of pixels 54 along the blending edge 60. The average intensity is provided by Equation I below:

$$I(r)_{AVG} = \frac{I(r,1)_A + I(r,1)_B}{2} \quad \text{Equation I}$$

where r=the row of the images;
$I(r,1)_A$=intensity of pixel in column "1" of row "r" of the first image (e.g. image 52a); and $I(r,1)_B$=intensity of pixel in column "1" of row "r" of the second image (e.g. image 52b).

Process 100 then proceeds to 108 where a blending ratio (R) is determined for each row of pixels of each image of the pair of abutting images. The blending ratio comprises the ratio of the average intensity of a given row, as determined in accordance with Equation I, to the intensity of the pixel along the blending edge of the given row. The blending ratios for each row of pixels of each image of the pair of abutting images are provided by Equations II-A and II-B below:

$$R(r)_A = \frac{I(r)_{AVG}}{I(r,1)_A} \quad \text{Equation II-A}$$

where $R(r)_A$=blending ratio for row "r" of the first image (e.g. image 52a); and
$I(r,1)_A$=intensity of pixel in column "1" of row "r" of the first image (e.g. image 52a).

$$R(r)_B = \frac{I(r)_{AVG}}{I(r,1)_B} \quad \text{Equation II-B}$$

where $R(r)_B$=blending ratio for row "r" of the second image (e.g. image 52b); and
$I(r,1)_B$=intensity of pixel in column "1" of row "r" of the second image (e.g. image 52b).

Process 100 then proceeds to 110, where the intensity values of pixels in a "fadeout" area along the blending edge of each image of the pair of abutting images are adjusted based on the blending ratios determined in accordance with Equations II-A and II-B. The fadeout area of each image of the pair of abutting images comprises a selectable number of columns adjacent to and including the blending edge of the image. In the illustrated example, images 52a and 52b respectively have fadeout areas 62a and 62b, each of the fadeout areas comprising four columns of pixels, including respective blending edges 60a and 60b.

In one embodiment, the intensity of pixels in a given row of pixels which are in columns within the fadeout area are scaled by a scaling factor having a value between one and the blending ratio of the given row, wherein the value of the scaling factor ramps smoothly to a value of one with distance from the blending edge. For example, in one embodiment, the intensity of the pixel of the given row which is in a column comprising the blending edge is scaled by a scaling factor having a value equal to the blending ratio for the given row. The pixels of the given row which are in columns within the fadeout area, but beyond the blending edge, are scaled by a scaling factor having a value which smoothly ramps to a value of one with distance from the blending edge, such that a pixel of the given row which is in the first column beyond the fadeout area is "scaled" by a value of one (i.e. not scaled).

As such, when one of the images is brighter than the other, the intensity of the brighter image ramps down in the fadeout area until the intensity of the blending edge is equal to the average intensity, while the intensity of the other image ramps up in the fadeout area until it too matches the average intensity. In this fashion, the intensities of the abutting pair of images are smoothly blended together in the fadeout areas.

As an example, with reference to image 52a of FIG. 2, the pixels 54 of each row of column "1" (i.e. blending edge 60a) are scaled by a scaling factor having a value equal to the corresponding blending ratio of each row. The pixels 54 of each row of columns "2" through "4" are scaled by a scaling factor having a value which smoothly ramps from the blending ratio to a value of "1" so that the pixels of column "5" and beyond are no longer scaled. If image 52a is brighter than image 52b, after scaling, the intensity of image 52a will ramp down from column "4" until it is equal to the average intensity at column "1". Conversely, the intensity of image 52b, after scaling, will ramp up from column "4" to column "1" until it is equal to the average intensity at column "1".

Equations III-A and III-B below respectively illustrate example equations that can be employed to determine scaled intensity values for pixels in the fadeout areas of two abutting images, such as fadeout areas 60a, 60b of abutting images 52a, 52b.

$$I(r,c)'_A = I(r,c)_A * \left[ R(r)_A - \left( \frac{R(r)_A - 1}{f} \right)(c-1) \right] \quad \text{Equation III-A}$$

where: c=column from blending edge;
r=row;
f=number of columns in fadeout area;
$I(r,c)'_A$=scaled intensity for the pixel at column "c" of row "r" of the first image (e.g. image 52a);
$I(r,c)_A$=intensity of the pixel at column "c" of row "r" of the first image (e.g. image 52a); and
$R(r)_A$=blending ratio for row "r" of the first image (e.g. image 52a).

As illustrated, the value within the "bracketed" area represents a scaling factor $SF(r)_A$ for row "r" of the first image "A", such as image 52a.

$$I(r,c)'_B = I(r,c)_B * \left[ R(r)_B - \left( \frac{R(r)_B - 1}{f} \right)(c-1) \right] \quad \text{Equation III-B}$$

where: c=column from blending edge;
r=row;
f=number of columns in fadeout area;
$I(r,c)'_B$=scaled intensity for the pixel at column "c" of row "r" of the second image (e.g. image 52b);
$I(r,c)_B$=intensity of pixel at column "c" of row "r" of the second image (e.g. image 52b); and
$R(r)_B$=blending ratio for row "r" of the second image (e.g. image 52b).

As illustrated, the value within the "bracketed" area represents a scaling factor $SF(r)_B$ for row "r" of the second image "B", such as image 52b.

In one embodiment, the blending ratio R for each row of pixels is not based solely on the ratio of the average intensity (IAVG) of the row to the intensity (I) of the pixel along the blending edge, as described above by Equations II-A and II-B relative to 108 of process 100. Rather, in one embodiment, the blending ratio of each row is additionally based on the blending ratios of adjacent rows of pixels. In one embodiment, the blending ratio of each row comprises an average of the blending ratio of each row and the blending ratio of a selectable range of preceding and subsequent number of adjacent rows of pixels, as determined in accordance with Equations II-A and II-B.

As such, the blending ratio of each row of pixels comprises a "sliding" average of a selectable range, or "window", of rows of pixels along the blending edge. The blending ratios obtained in this fashion are then employed to determine and apply scaling factors as described above in accordance with Equations III-A and III-B in regard to 110 of process 100. By employing a sliding average to calculate the blending ratio of each row of pixels, the blending ratios and thus, the scaling of pixel intensities, transitions more smoothly from row-to-row and reduces abrupt intensity changes from row-to-row.

The "averaged" blending ratios for each row of pixels of each image of the pair of abutting images are provided by Equations IV-A and IV-B below:

$$R(r)'_A = \frac{\sum_{r=(r-w)}^{(r+w)} R(r)_A}{2w+1} \quad \text{Equation IV-A}$$

where: r=row;
w=the number of rows before and after row "r" which are included in the sliding average;
$R(r)'_A$=averaged blending ratio for row "r" of the first image (e.g. image 52a); and
$R(r)_A$=blending ratio for row "r" of the first image (e.g. image 52a).

$$R(r)'_B = \frac{\sum_{r=(r-w)}^{(r+w)} R(r)_B}{2w+1} \quad \text{Equation IV-B}$$

where: r=row;
w=the number of rows before and after row "r" which are included in the sliding average;
$R(r)'_B$=averaged blending ratio for row "r" of the second image (e.g. image 52b); and
$R(r)_B$=blending ratio for row "r" of the second Image (e.g. image 52b).

Similarly, if the pair of abutting images (e.g. images 52a, 52b) comprise a portion of one frame of a plurality of frames of a shot of a movie/video, such as images 34a, 34b of frame 32a of shot 30 illustrated by FIG. 1A, blending ratios for each row of pixels of an image can be averaged with the blending ratios of corresponding rows of pixels of images at corresponding image positions of a selectable range of preceding and subsequent frames. In such a scenario, the blending ratio of corresponding rows of pixels of images at corresponding image positions within the selected range can be determined in accordance with Equations II-A and II-B and/or Equations IV-A and IV-B. By averaging blending ratios over multiple frames, the scaling of pixel intensities between corresponding rows of pixels from image-to-image transitions more smoothly from frame-to-frame, thereby reducing potential flicker between frames.

The blending ratios for each row of pixels of each image of the pair of abutting images when averaged over a selectable range of frames are provided by Equations V-A and V-B below:

$$R(r,f)''_A = \sum_{f=(f-w)}^{(f+w)} R(r,f)_A \quad \text{Equation V-A}$$

where: r=row;
  f=frame
  w=the number of frames before and after frame "f" which are included in the sliding average;
  R(r,f)"$_A$=averaged blending ratio for row "r" of the image in image position "A" of frame "f"; and
  R(r,f)$_A$=blending ratio for row "r" of the image in image position "A" of frame "f".

$$R(r,f)''_B = \sum_{f=(f-w)}^{(f+w)} R(r,f)_B \qquad \text{Equation V-B}$$

where: r=row;
  f=frame
  w=the number of frames before and after frame "f" which are included in the sliding average;
  R(r,f)"$_B$=averaged blending ratio for row "r" of the image in image position "B" of frame "f"; and
  R(r,f)$_B$=blending ratio for row "r" of the image in image position "B" of frame "f".

As illustrated by Equations V-A and V-B above, blending ratios R(r,f)$_A$ and R(r,f)$_B$ can be respectively determined using either of the processes described above by Equations II-A and II-B, and Equations IV-A and IV-B.

Figure 4:
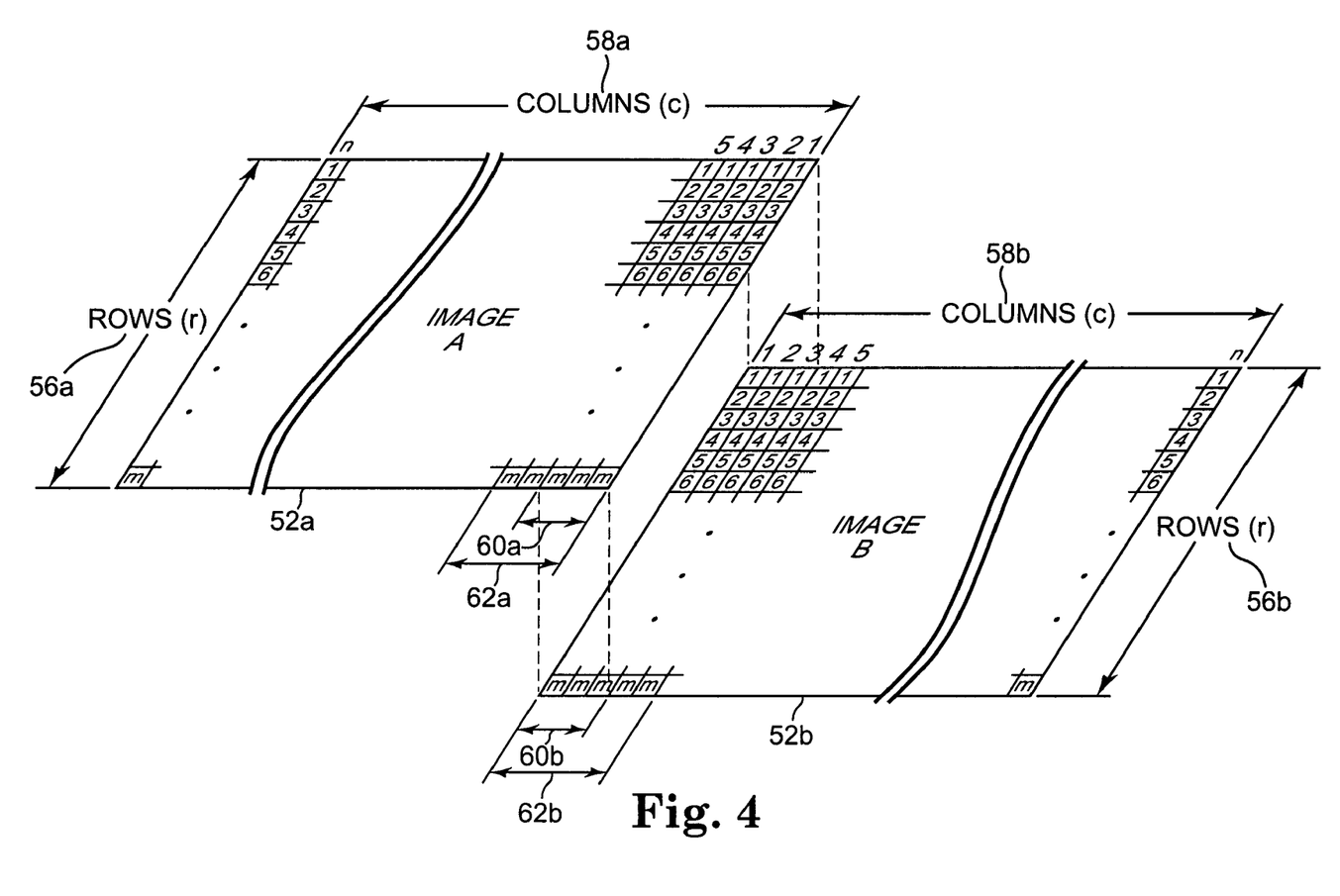
FIG. 4 illustrates generally an example of a pair of overlapping images.

FIG. 4 illustrates a pair of images 52a and 52b, wherein images 52a and 52b overlap with one another (as opposed to abutting one another as illustrated above by FIG. 2) and, when stitched together, form a single panoramic image. Again, each image 52a, 52b comprises a plurality of pixels 54, with the pixels of each image respectively arranged in a plurality of "m" rows (r) of pixels 56a, 56b and "n" columns (c) of pixels 58a, 58b. As illustrated, columns one through three of image 52a overlap with columns one through three of image 52b.

To stitch together a pair of overlapping images to form a panoramic image, the images must first be aligned. To align a pair of overlapping images, such as images 52a and 52b, an alignment transformation is determined. An alignment transformation generally corresponds to one image of the pair of overlapping images and represents a mapping between the pixels of the pair of overlapping images to a same coordinate system. When applied to one image of the pair, the alignment transformation shifts the coordinates of the pixels of the image such that the pair of images and the corresponding overlap region are in alignment. An example of an alignment system and method suitable for aligning the images of a sequence of frames, with each frame comprising a sequence of images, is described by U.S. patent application Ser. No. 11/000,660, entitled SYSTEM AND METHOD OF ALIGNING IMAGES, which was earlier incorporated herein by reference.

As mentioned earlier, even though the pair of images, such as images 52a and 52b, may be nearly perfectly aligned, when stitched together to form a panoramic image, the panoramic image will often exhibit distinct edges at the stitching boundaries of the individual images due to one or more factors such as different exposures, camera processing, and different development/aging of the individual images.

Figure 5:
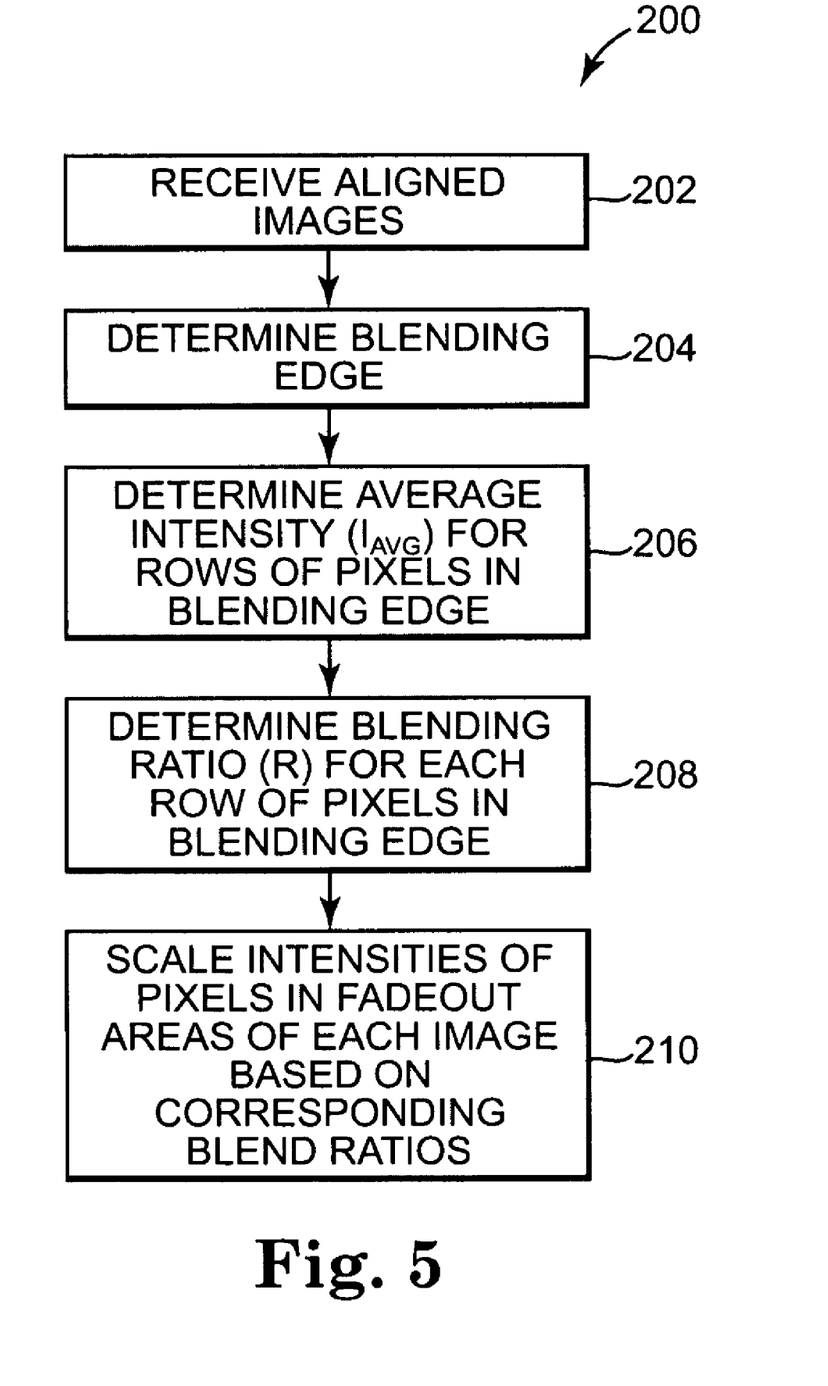
FIG. 5 is a flow diagram illustrating generally a process for blending abutting images according to one exemplary embodiment of the present invention.

FIG. 5 is a flow diagram illustrating generally a process 200 according to one embodiment of the present invention for blending together the edges between two overlapping images. Process 200 is described with reference to the pair 50 of overlapping images 52a and 52b illustrated above by FIG. 4. Process 200 begins at 202 with receipt of a pair of overlapping images from an alignment process, such as that described above, wherein an alignment transformation has been determined so that the overlapping areas of the images, such as columns one through three of images 52a and 52b, are in alignment.

At 204, a blending edge is determined for each of the images. In one embodiment, the blending edge of overlapping images, such as overlapping images 52a and 52b, comprises the overlapping regions of the images. Thus, in the illustrated example, the blending edge 60 comprises columns "1" through "3" of each image 52a, 52b, as respectively indicated by blending edges 60a and 60b.

At 206, an average intensity (I$_{AVG}$) is determined for pixels of each row of pixels in the blending edge of the images. In the illustrated example, an average intensity is determined for pixels 54 of each row (r) 56 in blending edges 60a and 60b of images 52a and 52b. The average intensity is provided by Equation VI below:

$$I(r)_{AVG} = \frac{\sum_{c=1}^{b}[I(r,c)_A + I(r,c)_B]}{2b} \qquad \text{Equation VI}$$

where c=the column;
  r=the row;
  b=number of columns in the blending edge;
  I(r)$_{AVG}$=average intensity of row "r" of blending edge;
  I(r,c)$_A$=intensity of pixel in column "c" of row "r" of the first image (e.g. image 52a); and
  I(r,c)$_B$=intensity of pixel in column "c" of row "r" of the second image (e.g. image 52b).

Process 200 then proceeds to 208, where a blending ratio (R) is determined for each row of pixels of each image of the pair of overlapping images. The blending ratio comprises the ratio of the average intensity to the intensity of the pixels in the blending area of a given row of pixels. The blending ratios for each row of pixels of each image of the pair of overlapping images are provided by Equations VII-A and VII-B below:

$$R(r)_A = \frac{\sum_{c=1}^{b} I(r,c)_A}{b * I(r)_{AVG}} \qquad \text{Equation VII-A}$$

where c=the column;
  r=the row;
  b=number of columns in the blending edge;
  I(r)$_{AVG}$=average intensity of row "r" of blending edge;
  I(r,c)$_A$=intensity of pixel in column "c" of row "r" of the first image (e.g. image 52a); and
  R(r)$_A$=blending ratio of row "r" of the first image (e.g. image 52a).

$$R(r)_B = \frac{\sum_{c=1}^{b} I(r,c)_B}{b * I(r)_{AVG}} \qquad \text{Equation VII-B}$$

where c=the column;
  r=the row;
  b=number of columns in the blending edge;

$I(r)_{AVG}$=average intensity of row "r" of blending edge;
$I(r,c)_B$=intensity of pixel in column "c" of row "r" of the second image (e.g. image 52b); and
$R(r)_B$=blending ratio of row "r" of the first image (e.g. image 52b).

Although not illustrated, the blending ratios (R) for rows of pixels of the overlapping images can comprise a "sliding" average of the blending ratios over a selected range of consecutive rows, as described above with regard to abutting images and Equations IV-A and IV-B. Additionally, if the overlapping images (e.g. images 52a and 52b of FIG. 4) comprises a portion of one frame of a plurality of frames of a shot of a movie/video, the blending ratios (R) for rows of pixels of the overlapping images can comprise an average of blending ratios of corresponding rows of pixels of images at corresponding image positions of a selectable range of preceding and subsequent frames, as described above with regard to abutting images and Equations V-A and V-B.

Process 200 then proceeds to 210, where the intensity of pixels in a "fadeout" area of each image of the pair of images are adjusted based on the corresponding blending ratios determined above at 208. The fadeout area of each image of the pair of overlapping images comprises a selectable number of columns adjacent to and including the blending edge of the image. In the illustrated example, images 52a and 52b respectively have fadeout areas 62a and 62b which include respective blending edges 60a and 60b.

In one embodiment, the intensity of pixels in a given row of pixels which are in columns within the fadeout area are scaled by a scaling factor having a value between "1" and the blending ratio (R) of the given row, wherein the value of the scaling factor ramps smoothly to a value of "1" with distance from the blending edge. For example, in one embodiment, the intensity of each pixel in the blending edge of a given row of pixels is scaled by scaling factor having a value substantially equal to the blending ratio for the given row such that the scaled intensity of each pixel is substantially equal to the average intensity of the blending area of the given row. The value of the scaling factor applied to pixels of the given row which are in the fadeout area, but beyond the blending area, smoothly ramps from the blending ratio for the given row to a value of "1", such that a pixel of the given row which is in the first column beyond the fadeout area is scaled by a value of "1" (i.e. not scaled).

Equations and procedures for scaling the intensities of pixels in the fadeout areas of each row based on the corresponding blending ratio of each row are similar to that described above with respect Equations III-A and III-B regarding abutting images, and can be similarly determined therefrom. As such, a detailed description is not included herein.

As described by the above embodiments, the scaling factors are based on a ratio of the average intensity of pixels of the blending edges at each pixel position to the intensity of the pixel of the at least one group of pixels of the blending edge at each pixel position of each image. However, the scaling factors can be based on other relationships between the average intensity of pixels of the blending edges at each pixel position and the intensity of pixels of the blending edge at each pixel position of each image. For example, in one embodiment, the scaling factors are based on a difference between the average intensity of pixels of the blending edges at each pixel position and the intensity of pixels of the blending edge at each pixel position of each image.

In some instances, a natural edge (e.g., a distinct object appearing in the image) may be present at or near the blending edge of one, or both, of the images. In such an instance, applying blending techniques in accordance with the present invention may blur such an edge, thereby introducing an unwanted visual artifact into the resulting panoramic image. As such, in one embodiment, an edge detecting module is provided which disables blending of the pair of images when a natural edge is detected. The presence of such a natural edge may produce relatively large scaling factors. Thus, in one embodiment, the scaling factors are limited to a selected scaling factor range.

Figure 6:
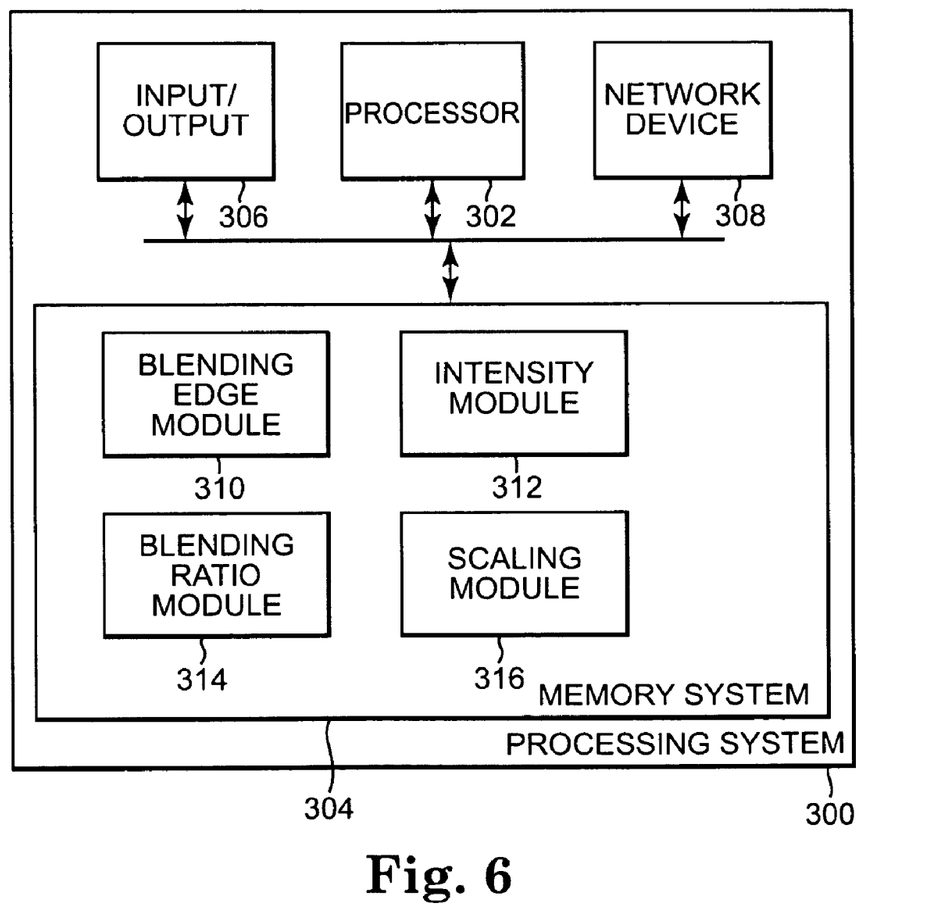
FIG. 6 is a block diagram illustrating a processing system for blending abutting images according to one exemplary embodiment of the present invention.

FIG. 6 is a block diagram illustrating a processing system 300 configured to blend images in accordance with embodiments of the present invention. Processing system 300 comprises a processor 302, a memory system 304, an input/output 306, and a network device 308. Memory system 304 comprises a blending edge module 310, an intensity module 312, a blending ratio module 314, and a scaling module 316. Processing system 300 comprises any type of computer system or portable or non-portable electronic device. Examples include desktop, laptop, notebook, workstation, or server computer systems. Examples of electronic devices include digital cameras, digital video cameras, printers, scanners, mobile telephones, and personal digital assistants.

In one embodiment, blending edge module 310, intensity module 312, blending ratio module 314, and scaling module 316 each comprise instructions stored in memory system 304 that are accessible and executable by processor 302. Memory system 304 comprises any number of types of volatile and non-volatile storage devices such as RAM, hard disk drives, CD-ROM drives, and DVD drives. In other embodiments, each of the modules 310 through 320 may comprise any combination of hardware, software, and firmware components configured to perform the functions described herein.

A user of processing system 300 controls the operation of blending edge module 310, intensity module 312, blending ratio module 314, and scaling module 316 by providing inputs and receiving outputs via input/output unit 306. Input/output unit 306 may comprise any combination of a keyboard, mouse, display device, or other input/output device that is coupled directly, or indirectly, to processing system 300.

Blending edge module 310, intensity module 312, blending ratio module 314, and scaling module 316 may each be stored on a medium separate from processing system 300 prior to being stored in processing system 300. Examples of such a medium include a hard disk drive, a compact disc (e.g., a CD-ROM, CD-R, or CD-RW), and a digital video disc (e.g., a DVD, DVD-R, or DVD-RW). Processing system 300 may access blending edge module 310, intensity module 312, blending ratio module 314, and scaling module 316 from a remote processing or storage system (not shown) that comprises the medium using network device 308.

In operation, processing system 300 receives a pair of images, such as pair 50 of images 52a and 52b illustrated by FIG. 2 and FIG. 4. Each image comprises a plurality of pixels arranged in a plurality of rows and columns, with each pixel having an intensity. Processing system 300 executes blending edge module 310 to determine the blending edge of each image, such as described at 104, 204 of process 100, 200 of FIG. 3 and FIG. 5.

Processing system 300 then executes intensity module 312 to determine an average intensity between corresponding rows of pixels of the blending edge, such as described at 106, 206 of process 100, 200 of FIG. 3 and FIG. 5, and by Equations I and VI. After determining the average intensity for each row of pixels in the blending edge, processing system 300 executes blending ratio module 314 to determine a blending ratio for each row of pixels of each pair of images, such as described at 108, 208 of process 100, 200 of FIG. 3 and FIG.

5. In one embodiment, the blending ratio comprises the ratio of the average intensity of a given row, as determined by intensity module 312, to the intensity of the pixel in the given row of the blending edge, as described above by Equations II-A and II-B, and Equations VII-A and VII-B. In one embodiment, blending ratio module 314 determines blending ratios as described above by Equations IV-A and IV-B. In one embodiment, blending ratio module 314 determines blending ratios as described above by Equations V-A and V-B.

Process system 300 then executes scaling module 316. In one embodiment, scaling module 316 determines a blending area, or "fadeout" area, for each image comprising a plurality of columns of pixels adjacent to and including the blending edge of the image. In one embodiment, scaling module 316 determines a scaling factor for each row of pixels in the blending area of each image based on the blending ratio of each row as determined by blending ratio module 314. In one embodiment, scaling module 316 scales the pixels in each row of pixels in the blending area by a corresponding scaling factor having a value that ramps smoothly from the blending ratio of the corresponding row to a value of "1" with distance from the blending edge, as described at 110, 210 of process 100, 200 of FIG. 3 and FIG. 5, and by Equations III-A and III-B.

Although described herein primarily with respect to a pair of abutting and/or overlapping images, systems and methods of blending images in accordance with the present invention are suitable for use with panoramic images formed by more than one pair of images, and to panoramic movies/videos comprising multiple frames, with each frame comprising a panoramic image formed by at least one pair of images. Additionally, while not specifically described herein, blending techniques in accordance with the present invention are readily adaptable for application to images with pixels having linear intensity values, gamma corrected intensity values, or any other color-corrected intensity values.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of blending a pair of images, each image comprising a plurality of pixels having an intensity, the method comprising: determining a blending edge for each image, each blending edge comprising at least one group of pixels, with each pixel at a pixel position; determining an average intensity of pixels of the blending edges at each pixel position; determining a scaling factor based on a relationship between the average intensity and the intensity of the pixel of the at least one group of pixels of the blending edge at each pixel position of each image; determining a blending area for each image, each blending area comprising at least one group of pixels having a pixel at each of the pixel positions; and scaling the intensity of the pixel at each pixel position of the at least one group of pixels of the blending area of each image with the corresponding scaling factor.

2. The method of claim 1, wherein the scaling factor is based on a difference between the average intensity and the intensity of the pixel of the at least one group of pixels of the blending edge at each pixel position of each image.

3. The method of claim 1, wherein the scaling factor is based on a ratio of the average intensity to the intensity of the pixel of the at least one group of pixels of the blending edge at each pixel position of each image.

4. The method of claim 3, wherein the scaling factor for each pixel position of each image is based on the ratio corresponding to the pixel position and ratios corresponding to one or more selected pixel positions.

5. The method of claim 3, wherein the scaling factor for each pixel position of each image is based on an average of the ratio corresponding to the pixel position and ratios corresponding to a selected range of pixel positions adjacent to and including the pixel position.

6. The method of claim 3, wherein each blending area comprises a plurality of groups of pixels, each group having a pixel at each of the pixel positions, and wherein the scaling factor corresponding to each pixel position adjusts based on a proximity of the corresponding group of pixels of the blending area to the blending edge.

7. The method of claim 3, wherein the scaling factor adjusts to a value of one as the corresponding groups of pixels are further removed from the blending edge.

8. The method of claim 3, wherein the scaling factor scales each pixel of the at least one group of pixels of each blending edge so that each pixel has an intensity substantially equal to the average intensity of the corresponding pixel position.

9. A method of blending a first and a second image, each image comprising a plurality of pixels having an intensity, the method comprising: determining a blending edge for each image, each blending edge comprising at least one group of pixels, with each pixel at a pixel position; determining a first ratio comprising a ratio of an average intensity of pixels at a first pixel position of the blending edges of both images to the intensity of the pixel at the first pixel position of the blending edge of the first image; determining a second ratio comprising a ratio of an average intensity of pixels at a second pixel position of the blending edges of both images to the intensity of the pixel at the second pixel position of the blending edge of the first image; determining a blending area for each image, each blending area comprising at least one group of pixels having a pixel at each of the pixel positions; and scaling the intensity of the pixel at the first pixel position of the at least one group of pixels of the blending area of the first mage with a scaling factor based on the first and second ratios.

10. The method of claim 9, wherein the scaling factor comprises an average of the first and second ratios.

11. The method of claim 9, wherein the blending area of each image comprises a plurality of groups of pixels, with each pixel of each group at a pixel position, wherein the scaling factor scales the pixel at the first pixel position of each group of pixels of the blending area and adjusts based on a proximity of each group of pixels to the blending edge.

12. A method of blending image of a series of frames, each frame comprising at least one pair of images, and for each pair of images the method comprising: determining a blending edge for each image, each blending edge comprising at least one group of pixels, with each pixel at a pixel position; determining an average intensity of pixels of the blending edges at each pixel position; determining a ratio of the average intensity to the intensity of the pixel of the at least one group of pixels of the blending edge at each pixel position for each image; determining a blending area for each image, each blending area comprising at least one group of pixels having a pixel at each of the pixel positions; and scaling the intensity of the pixel at each pixel position of the at least one group of pixels of the blending area of each image with a corresponding scaling factor based at least on the ratio corresponding to the pixel position.

13. The method of claim 12, wherein the scaling factor for each pixel position of each image is based on the ratio corresponding to the pixel position and ratios corresponding to one or more selected pixel positions.

14. The method of claim 12, wherein the scaling factor for each pixel position of each image is based on an average of the ratio corresponding to the pixel position and ratios corresponding to a selected range of pixel positions adjacent to the pixel position.

15. The method of claim 12, wherein the scaling factor for each pixel position of each image is based on the ratio corresponding to the pixel position of the image and ratios of corresponding pixel positions of corresponding images of selected frames of the series of frames.

16. The method of claim 15, wherein the selected frames comprise a range of frames including and adjacent to the frame of the image corresponding to the scaling factor.

17. The method of claim 16, wherein the scaling factor comprises an average of the ratio corresponding to the pixel position of the image and the ratios of the corresponding pixel positions of the corresponding images of the frames of the selected range.

18. A system for processing a pair of images, each image comprising a plurality of pixels having an intensity, the system comprising: a processor; a memory storing instructions executable by the processor, the instructions comprising: a blending edge module for determining a blending edge for each image, each blending edge comprising at least one group of pixels, with each pixel at a pixel position; an intensity module for determining an average intensity of pixels of the blending edges at each pixel location; a blending ratio module for determining a ratio of the average intensity to the intensity of the pixel of the at least one group of pixels of the blending edge at each of the pixel positions; and a scaling module for determining a blending area for each image, each blending area comprising at least one group of pixels having a pixel at each of the pixel positions, and for scaling the intensity of the pixel at each pixel position of the at least one group of pixels of the blending area of each image with a corresponding scaling factor based at least on the ratio corresponding to the pixel position.

19. A computer-readable medium including instructions executable by a processing system for performing a process for blending a pair of images, each image comprising a plurality of pixels having an intensity, the instruction comprising: determining a blending edge for each image, each blending edge comprising at least one group of pixels, with each pixel at a pixel position; determining an average intensity of pixels of the blending edges at each pixel position; determining a scaling factor based on a relationship between the average intensity and the intensity of the pixel of the at least one group of pixels of the blending edge at each pixel position of each image; determining a blending area for each image, each blending area comprising at least one group of pixels having a pixel at each of the pixel positions; and scaling the intensity of the pixel at each pixel position of the at least one group of pixels of the blending area of each image with the corresponding scaling factor.

20. The computer-readable medium of claim 19, including instructions for determining the corresponding scaling factor for each pixel position of the blending area of each image based on the scaling factor corresponding to the pixel position and on one or more scaling factors corresponding to selected pixel positions of the image.

21. The computer-readable medium of claim 19, including instructions for determining the corresponding scaling factor for each pixel position of the blending area of each image based on an average of the scaling factor corresponding to the pixel position and on one or more scaling factors corresponding to selected range of pixel positions of the image.

22. A system for blending image of a series of frames, each frame comprising at least one pair of images, and for each pair of images the system comprising: a processor; a memory storing instructions executable by the processor, the instructions comprising: means for determining a blending edge for each image, each blending edge comprising at least one group of pixels, with each pixel at a pixel position; means for determining an average intensity of pixels of the blending edges at each pixel position; means for determining a scaling factor based on a relationship between the average intensity and the intensity of the pixel of the at least one group of pixels of the blending edge at each pixel position of each image; means for determining a blending area for each image, each blending area comprising at least one group of pixels having a pixel at each of the pixel positions; means for determining a scaling factor for each pixel position of the blending area of each image based at least on the ratio corresponding to the pixel position; and means for scaling the intensity of the pixel at each pixel position of the at least one group of pixels of the blending area of each image with the corresponding scaling factor.

23. A system for blending a first and a second image, each image comprising a plurality of pixels having an intensity, the system comprising: a processor; a memory storing instructions executable by the processor, the instructions comprising: means for determining a blending edge for each image, each blending edge comprising at least one group of pixels, with each pixel at a pixel position; means for determining a first scaling factor based on a relationship between an average intensity of pixels at a first pixel position of the blending edges of both images to the intensity of the pixel at the first pixel position of the blending edge of the first image; means for determining a second scaling factor based on a relationship between an average intensity of pixels at a second pixel position of the blending edges of both images to the intensity of the pixel at the second pixel position of the blending edge of the first image; means for determining a blending area for each image, each blending area comprising at least one group of pixels having a pixel at each of the pixel positions; and means for scaling the intensity of the pixel at the first position of the at least one group of pixels of the blending area of the first mage based on the first and second scaling factors.

* * * * *

UNITED STATES PATENT AND TRADEMARK OFFICE
CERTIFICATE OF CORRECTION

PATENT NO. : 7,450,137 B2  Page 1 of 1
APPLICATION NO. : 11/060918
DATED : November 11, 2008
INVENTOR(S) : Yining Deng et al.

It is certified that error appears in the above-identified patent and that said Letters Patent is hereby corrected as shown below:

In column 12, line 42, in Claim 9, delete "mage" and insert -- image --, therefor.

In column 14, line 56, in Claim 23, delete "mage" and insert -- image --, therefor.

Signed and Sealed this

Twelfth Day of May, 2009

JOHN DOLL
*Acting Director of the United States Patent and Trademark Office*